Patented Jan. 22, 1924.

1,481,671

UNITED STATES PATENT OFFICE.

THOMAS J. ALLEN, OF EUREKA SPRINGS, ARKANSAS, ASSIGNOR TO THE YEASTOLE COMPANY, OF EUREKA SPRINGS, ARKANSAS, A CORPORATION OF ARKANSAS.

YEAST COMPOUND AND PROCESS OF MAKING THE SAME.

No Drawing.    Application filed July 7, 1921.   Serial No. 483,070.

*To all whom it may concern:*

Be it known that I, THOMAS J. ALLEN, a citizen of the United States, residing at Eureka Springs, in the county of Carroll and State of Arkansas, have invented a new and useful Yeast Compound and Process of Making the Same, of which the following is a specification.

This invention relates to a new and improved yeast compound and to a process of making the same so as not to be susceptible to the action of molds and pernicious bacteria which ordinarily infest and attack the yeast, causing deleterious changes therein.

Yeast, having gained such widespread reputation as an important food for all animal life, since it was discovered that it provides the richest source of vitamines, elements essential to maintain bodily health and vigor, should be kept absolutely free from bacteria and molds that destroy the cells of the yeast plant, for otherwise it would lose its therapeutic and tonic qualities.

Numerous attempts have been made to check the bacteria and prevent the growth of molds at the expense of the product itself. In the first place, coatings which must be removed before use have been employed to prevent mold growth only, while in the second place, additional ingredients have been supplied to the yeast which either lowered the quality or had to be removed before the yeast could be used.

I propose to add to my yeast, in a certain manner, a small quantity of material which will not only prevent molds and bacteria from growing in the yeast, but which will impart to the same important therapeutic qualities. I have discovered that by the addition of a certain percentage of charcoal, at a particular stage in the process of the manufacture of the yeast, the formation of molds is prevented and the vitality of the yeast is greatly prolonged.

As the basis of my yeast, I prefer to employ the following ingredients substantially in the proportions specified:—

100 lbs. cornmeal;
16 " rice flour;
8 " barley flour;
8 " wheat flour;
4 " diastase;
7 " charcoal;
½ " yeast;
12 gals. water;
1 lb. hops.

With established cultures, a starter is prepared as set forth in the first four of the following steps:

1. Hops are boiled for twenty minutes in the quantity of water.

2. The rice flour, wheat flour, barley flour, and diastase, are thoroughly mixed and scalded with half of the above given quantity of water at boiling point.

3. The mixture is then cooled to about 80° F., when the yeast is added.

4. This mixture, known as the starter, is allowed to ferment as far as possible under a constant temperature not exceeding 80° F., for twelve hours.

5. The charcoal is thoroughly mixed with cornmeal and the combination heated to 160° F., and later gradually reduced in temperature to 80° F. The starter, as previously described, with the remaining six gallons of hot water, is added to the mixture of charcoal and cornmeal and the whole is thoroughly incorporated.

6. This final product is maintained at a constant temperature of 75° F., for twelve hours.

7. At the expiration of this time, the matured yeast is placed upon drying racks and when thoroughly dry, is granulated or made into cakes and packed in cartons for the market.

The purpose of scalding the mixture of cereal flours and diastase is to kill all wild yeasts, molds and bacteria which may be initially present in the mixture. The step or cooling to about 80° F. is necessary, otherwise the yeast culture would be killed when subsequently added. 75° to 80° F. is an ideal temperature to promote the growth of yeast, substantially free from injurious bacteria. The charcoal is mixed with cornmeal as a convenient medium for the introduction of the charcoal into the yeast starter, and the charcoal cornmeal mixture is heated to 160° F. to kill, as before, all wild yeasts, mold and harmful bacteria. The product is maintained at about 75° F. for the twelve hours to insure a growth as vigorous and extensive as possible.

The product resulting from this process maintains its vitality and freshness for a much longer period than any known yeast, tests proving that this combination of yeast and charcoal remains fresh and wholesome even after six months, while other yeasts deteriorate within a short time. Ordinarily, dried yeast spoils in a very few weeks, and compressed yeast within a very few days unless it is kept on ice.

The proportions noted above may be varied and the mixture, commonly called "the starter" may be formed in various ways with different constituents as is well known.

A gas evolved by yeast which is vital to certain yeast destroying bacteria is absorbed by the charcoal, which has the ability to absorb at least eighty times its volume of gas. Furthermore, charcoal is a valuable remedy for both autogenous and exogenous toxins in the human system.

While I prefer cornmeal as the agent to combine with charcoal in introducing the latter to the yeast compound, I may substitute natural rice flour or barley flour.

What is claimed is:—

1. The process of making a yeast compound consisting in preparing a starter, mixing a cereal meal with charcoal, heating the mixture and then allowing it to cool, adding the starter to the mixture, maintaining the whole at a temperature at which the yeast will grow, then drying the product.

2. The process of making a yeast compound which consists in adding freshly heated charcoal at a temperature below that which will inhibit the growth of yeast to a food product containing diastase, adding a yeast starter to the mixture, maintaining the mixture at a temperature conducive to the growth of yeast, then drying the product.

3. The process of making a yeast compound, consisting in boiling a small quantity of hops in a large quantity of water, mixing cereal flour and diastase, and then scalding the mixture with part of the hop-water, reducing the temperature of the mixture below the boiling point, adding yeast thereto, subjecting the mixture to a constant temperature below the boiling point until the same is thoroughly fermented, adding thereto a mixture of cornmeal and charcoal which has first been heated and then reduced in temperature, letting the combination stand for a period of time at a temperature below blood heat, then drying the yeast compound and preparing it for market.

4. The process of making a yeast compound, consisting in boiling a small quantity of hops for a short period of time in a large quantity of water, scalding a mixture of rice flour, wheat flour, barley flour and diastase with part of the hop-water, reducing the temperature of the mixture to less than 100° F., adding yeast to it, subjecting the mixture thus formed to a constant temperature for a long period of time until the same is thoroughly fermented, then heating an intimate mixture of charcoal and cornmeal to about 160° F., reducing the temperature of the second mixture to the temperature at which the first-mentioned mixture was fermented, then thoroughly incorporating the two mixtures with hop-water and then subjecting the whole for an extended period to a constant temperature which is conducive to the growth of the yeast, thoroughly drying the matured yeast thus formed.

5. The process of making a yeast compound, consisting in boiling one pound of hops for twenty minutes in twelve gallons of water; scalding a mixture of sixteen pounds of rice flour, eight pounds of barley flour, eight pounds of wheat flour, and four pounds of diastase, with half the quantity of hop water at boiling point; cooling said mixture to about 80° F., and then adding one-half pound of yeast; subjecting this mixture to a constant temperature not exceeding 80° F. for twelve hours for the purpose of fermenting the same; then subjecting an intimate mixture of one hundred pounds of cornmeal and seven pounds of charcoal to a temperature of about 160° F.; reducing the temperature to about 80° F.; thoroughly incorporating these two mixtures with each other and at the same time adding six gallons of hop-water, subjecting the product thus formed to a constant temperature of about 75° F. for twelve hours; thoroughly drying the matured yeast thus formed, and granulating the same.

6. The process of making a yeast compound, consisting in heating an intimate mixture of charcoal and cornmeal to about 160° F., reducing the temperature of this mixture to about 80° F., thoroughly incorporating a starter which is heated to about 80° F. with the above mixture, adding a quantity of warm hop-water to the lastnamed mixture, and subjecting the whole to a temperature of about 75° F., for an extended period of time, thoroughly drying the matured yeast thus formed, and preparing the same for the market.

7. A yeast compound comprising a fermented mixture of cereal flour, diastase, yeast and hop-water, combined with a mixture of charcoal, cornmeal and hop-water.

8. A yeast compound comprising a fermented mixture of sixteen pounds of rice flour, eight pounds of barley flour, eight pounds of wheat flour, four pounds of diastase, one-half pound of yeast and six gallons of hop-water, combined with a mixture of seven pounds of charcoal, one hundred pounds of cornmeal and six gallons of hop-water.

In testimony that I claim the foregoing as my own, I have hereto affixed my signature.

THOMAS J. ALLEN.